United States Patent [19]
Miranda

[11] Patent Number: 6,107,575
[45] Date of Patent: Aug. 22, 2000

[54] CABLE CHANNEL SECTION

[75] Inventor: Giovanni Miranda, Spaichingen, Germany

[73] Assignee: Hilti Aktiengesellschaft, Schaan, Liechtenstein

[21] Appl. No.: 09/011,783

[22] PCT Filed: Jun. 13, 1997

[86] PCT No.: PCT/DE97/01245

§ 371 Date: Jul. 23, 1998

§ 102(e) Date: Jul. 23, 1998

[87] PCT Pub. No.: WO97/50161

PCT Pub. Date: Dec. 31, 1997

[30] Foreign Application Priority Data

Jun. 24, 1996 [DE] Germany ........................ 296 10 947 U

[51] Int. Cl.$^7$ ................................ H02G 3/00; H02G 3/02
[52] U.S. Cl. ..................... 174/101; 174/68.3; 174/68.1; 174/97
[58] Field of Search .................................. 174/101, 68.3, 174/95, 97, 68.1

[56] References Cited

U.S. PATENT DOCUMENTS

| | | | |
|---|---|---|---|
| 3,403,220 | 9/1968 | Riedel et al. ........................... | 174/101 |
| 3,727,644 | 4/1973 | Kagan ...................................... | 138/155 |
| 4,907,767 | 3/1990 | Corsi et al. .............................. | 248/49 |
| 4,942,271 | 7/1990 | Corsi et al. ............................. | 174/101 |
| 4,953,735 | 9/1990 | Tisbo et al. ................................. | 220/6 |

*Primary Examiner*—Kristine Kincaid
*Assistant Examiner*—Mark Olds
*Attorney, Agent, or Firm*—Brown & Wood, LLP

[57] ABSTRACT

A cable channel section including a plurality of wall elements pivotable in a predetermined angular region, hinge elements for releasably connecting adjacent wall elements with a possibility of a pivotal movement of one of the adjacent wall elements relative to another of the adjacent wall elements and formed integrally with respective adjacent wall elements, and locking elements for fixedly securing the adjacent wall elements in their end position with one locking element being formed as a detent hook carried by a stationary leg projecting from one of the adjacent wall elements, and another locking element being formed as a locking heel carried by an elastically deflectable resilient finger formed integrally with another of the adjacent wall elements.

13 Claims, 7 Drawing Sheets

CABLE CHANNEL SECTION

BACKGROUND OF THE INVENTION

1. Field of the Invention

The present invention relates to a cable channel section having a plurality of wall elements releasably connectable with each other by hinge elements formed integrally with respective wall elements, with the wall elements being pivotable in a predetermined angular region and being secured in their end positions with locking elements one of which is formed as a detent hook carried by a stationary leg extending from one of two cooperating wall elements, and the other of which is formed as a locking heel provided on the other of the two cooperating wall elements.

2. Description of the Prior Art

Such a cable channel section is known from German Utility Model DE 92 03 942U from which the present invention proceeds. It has several wall elements e.g., bottom and two side wall elements which are loosely and captively but releasably connected by with each other by hinge elements formed integrally thereon. The side wall elements can pivot relative to the bottom within a predetermined angular range and be fixed in an end position with locking elements. The locking elements of respective two adjacent wall elements are adapted to each other, e.g., in a form a detent hook, which is carried by a stationary lever spaced form the wall element, and a locking element provided on the bottom element in a form of a locking heel. Thereby, it is possible to transport the cable channel section in a flat space-saving condition and to form, at a site of use, a U-shaped cable channel by appropriate pivoting of the wall elements and subsequent securing of the side wall elements. Finally, the cable channel can be closed by a grip-in cover.

It is also possible, with correspondingly formed wall elements, to construct modular cable channel system, in which the integrally formed hinge elements permit to form multi-sectional channels with separable from each other individual compartments forming a composite structure. An advantage of this consists in that cable channel sections of different shapes can be formed with a comparatively small number of different wall elements. The hinge elements permit such a selection of individual wall elements that expanding or changing the design can be done without a problem. The locking elements insure that the wall elements are reliably held in their predetermined end position.

Though this cable channel section proved itself in practice, the feature associated with that the locking elements indeed provide for a reliable fixing of the wall elements in the end position but partially are difficult to actuate, turned out to be a drawback in certain applications and under some operational conditions. Thus, a lot of time and efforts are necessary to interlock the wall elements with each other or, during a release, to disengage the detent hook from the corresponding locking heel and thereby enable its folding. Often, this can be done only by accepting some damage from a working tool, such as, e.g., a screw driver, so that under unfavorable conditions, a new use of the side wall is not any more possible.

This problem is particularly encountered when a cable channel section, with which opening and closing processes need be done along a big circumference, should be produced. As example, one can name so-called rail channels which serve for housing electrical drives, transmission media, connection and hook-up components. They permit various arrangement of different hook-up components such as, e.g., sockets, hook-up for telecommunication and the like, which position and arrangement can be adapted to different interchangeable heights. Often, it is desired to keep the overall appearance conventional, in particular, when later a new generation of constructions is formed by fitting on new components.

E.g., German Publication DE 29 46 841 suggests a protective cover for such a rail channel which is spaced from the plane of connection and hook-up components and present an aesthetic satisfactory solution. The drawback here consists in that the rail channel is formed of rigid elements so that with subsequent arrangement of conductors, those should be threaded into the already inserted plug boxes. Operating this cover element is not without a problem, as it hangs up from one guide slot. This permits to fix the over element temporarily in an open position, however there exists a danger that the cover element may be pushed and fold back during handling. Also, the cover element can slide out of the guide slot and fall down.

Accordingly, an object of the invention is to find a solution which would permit to produce a cable channel, in particular a rail channel, which would lend itself to a better handling, while retaining the modularity of the above-described cable channel section.

SUMMARY OF THE INVENTION

This object is achieved with a cable channel section that has features of claim 1. Advantageous embodiments of the invention are defined by subclaims.

The invention is based on an idea that the locking function can be improved by mounting the locking heel, which cooperates with detent hook, on a elastically deflectable resilient finger. This one further is formed integrally with a corresponding wall elements, while representing an independent function element. In contrast to the conventional principle of forming the locking heel directly on the hinge, a significant improvement in handling is achieved. A comparatively small pressure applied to the resilient finger is sufficient to disengage the locking heel from the detent hook.

Also forces, which are applied during formation of the cable channel, are significantly smaller as the resilient finger, because of its elastical deflection property, can be easily deflected when the detent hook rides along the slide ramp of the locking heel. On the other hand, the resilient finger insures a reliable fixation of the locking heel on the detent hook.

Further advantages become apparent during manufacturing of a type described above in which the locking heel is carried out by an elastically deflectable resilient finger.

Advantageously, an abutment heel is formed on the resilient finger and which is supported against the adjacent wall element and; thus, preloads the locking heel against the detent hook of the wall element.

A particular space-saving design is obtained when the resilient finger is arranged immediately adjacent to the hinge element. Thereby, an optimal cross-section of the structure is obtained because the detent function is simply limited to the region surrounding the hinge element.

Under this aspect, an optimal construction of the resilient finger is obtained when it, at least approximately tangentially passes into a hollow cylinder segment-shaped section of the hinge element. Thereby, its profile follows the outer profile of the hinge to a most possible extent. At that, a sufficient distance for the deflection path must be provided. On the other hand, this configuration protects the resilient finger from a possible overload as it can only be deflected until it abuts the hinge element.

This function is further improved when the resilient finger has a slightly curved profile so that it, if necessary, can flatly abut the hinge element.

Further improvements are directed to retaining the wall elements not only in the predetermined end position but to definitely retain them in further angular positions. This is particularly important for above-discussed rail channels in which the cover element should be retained in an open position in order, e.g., to be capable of being used as a plug box.

Such a possibility is an advantage in other application also, e.g., for folding a side wall element during mounting. Often, a complete opening is undesirable because the laid-down conductors can easily fall out. Therefore, it is an advantage when the side wall element can be simply so wide folded out that an access to the corresponding channel section becomes possible.

To this end, stop elements are formed on a hinge pin and cooperate with corresponding hinge elements of a hinge shell. The advantage of this solution consists in that the stop function can be directly integrated in a hinge element so that no additional mounting space is needed.

A particularly simple construction is obtained when the stop elements are formed, respectively, as a groove and a cam projection. E.g., the cam projection is formed on the hinge shell and the groove is formed in the hinge pin. During the pivotal movement, the cam projection slides along the hinge pin and is pressed into the groove by resilient deformation forces. By corresponding rounding off, it is insured that locking and unlocking becomes possible with comparatively small forces. On the other hand, however, a reliable stoppage is achieved.

In addition, by multiple arrangement of stop elements in particular grooves, multiple stoppages in different angular position are achieved. The advantages of a rail channel consists in its configuration as U-shaped base section in which the wall elements are formed as a bottom element and two side wall elements which are connected by hinges, and the cover element is attach ed with hinges as discussed previously.

Preferably, the wall elements carry each, at one of the side, a ledge element at an end opposite to the hinge element and which itself is pivotally connected with the corresponding side wall element by a hinge. Thereby, it can be folded without any problem and be fixed with locking members in a predetermined angular position. The ledge elements are connected in this embodiment by co-extruded hinges from soft PVC, or alternatively, by film hinges, formed integrally with the ledge elements. These hinges are more cost-effective in manufacturing in comparison with previously described hinges. The modular selection at this location is not needed because, if desired, the entire side wall element can be replaced.

When co-extruded hinges from soft PVC are used, a possibility exists for selection of color such that the soft PVC has a different color than the wall elements.

The ledge elements facilitate access to the cable channel because the conductors now can be laid down past the already arranged constructional elements, as the case may be. Additions and changes can be effected without problems. The ledge elements can advantageously support the bridge elements which, e.g., includes mounts for the cover element in a form of above-described hinges.

Further, spacing elements can be mounted on the ledge elements and which cooperate with the cover element so that the latter occupies a certain angular position in a closed condition.

BRIEF DESCRIPTION OF THE DRAWINGS

Below, the invention will be explained in detail with reference to the drawings showing the embodiments of the invention. The drawings show.

DETAILED DESCRIPTION OF THE PREFERRED EMBODIMENTS

Figure 1:
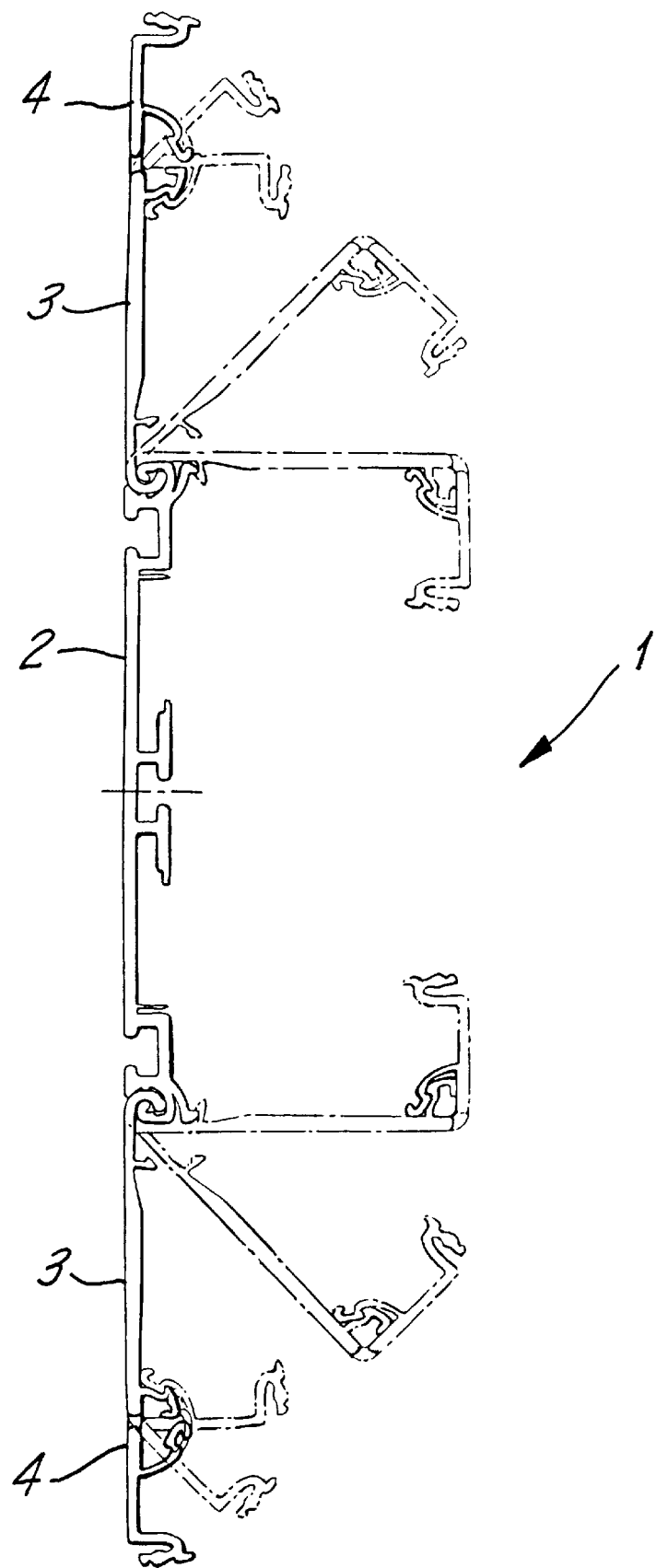
FIG. 1 a plan view of a cable channel section, according to the present invention in a condition thereof.

FIG. 1 shows a cable channel profile 1 which is formed of a plurality of wall elements, namely, a bottom element 2, two side wall elements 3 as well as two ledge elements 4. The drawings shows an initial position, namely, the laid flat arrangement for transportation.

Further, lighter lines indicate different stages of upward folding leading to a final position.

Figure 2:
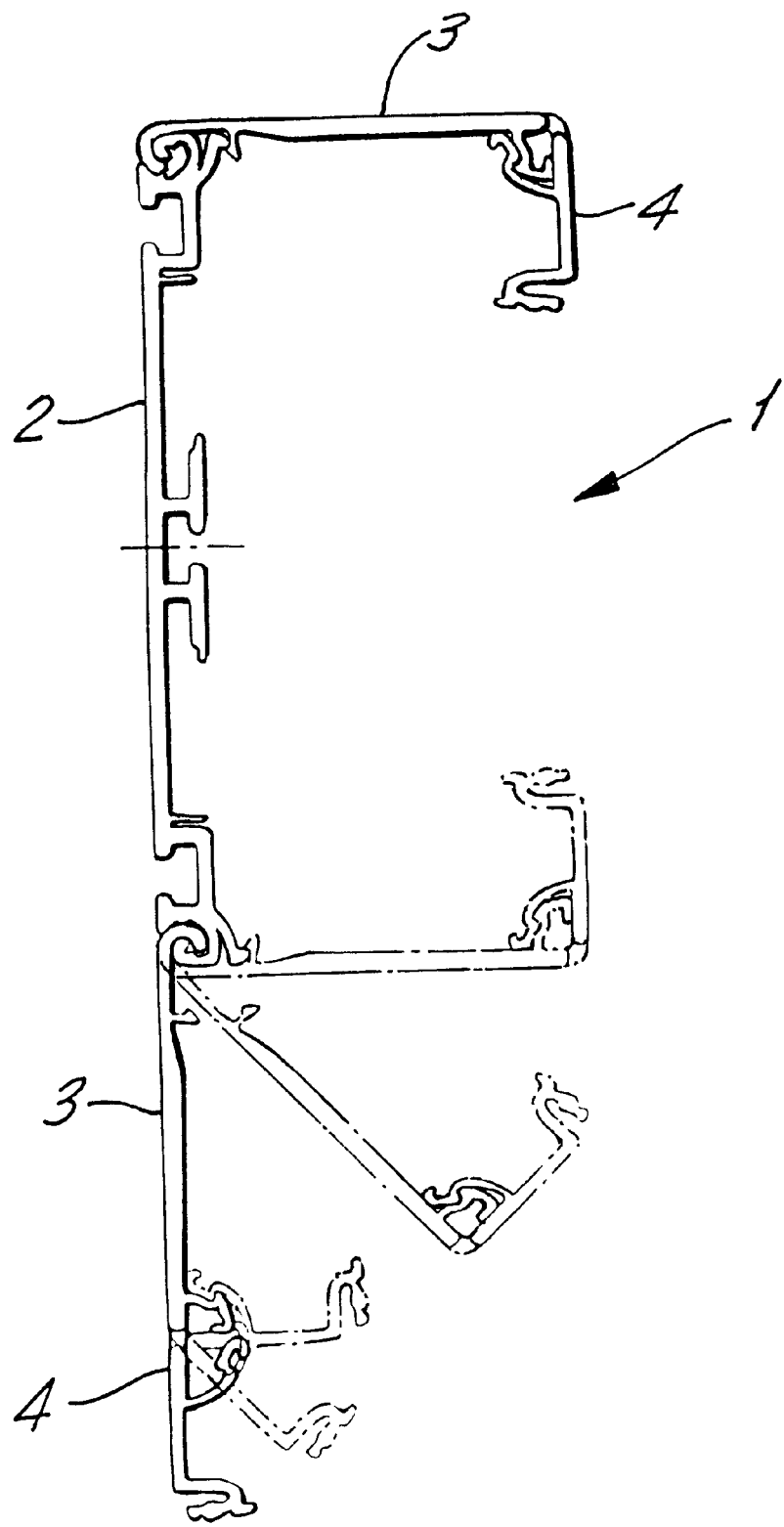
FIG. 2 a plan view of a cable channel section according to FIG. 1, in a partially erected condition thereof.

FIG. 2 shows the same cable channel section 1 in which the upper region, the side wall elements 3 and the ledge elements 4 are shown in the end position. The lower-lying section shows an initial position, with the superimposed intermediate and end positions indicated with thin dash lines.

For functioning, it is essential that respective and regions of the wall elements 2, 3, 4 are so formed that, on one hand, the indicated pivotal movement is possible and, on the other hand, the fixation in the folded position is possible.

Figure 3:
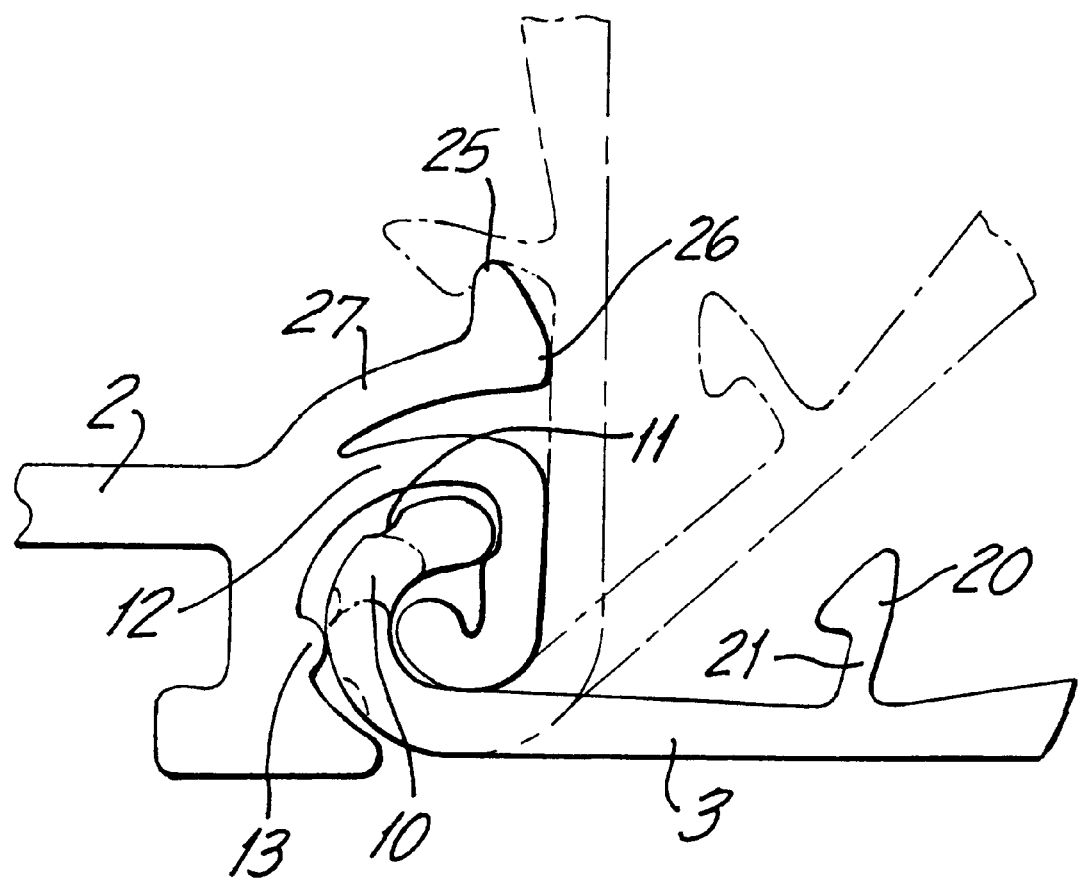
FIG. 3 a schematic view of a hinge connection according to the present invention at an increased scale.

According to FIGS. 1 and 2, the side wall elements 3 are connected with the bottom element 2 with hinges 10, 11, 12, 13, as shown at a substantially increased scale in FIG. 3.

The bottom element 2 has hinge shell 12, which is essentially formed as a circular segment of a hollow cylinder. Thereinto, a hinge pin 10, which has a somewhat semi-circular shape and which is formed on the side wall element 3 extends. Thereby, the side wall element 3 can pivot, with respect to the bottom element 2, in a predetermined angular region, namely, starting from laid-flat initial position, which is indicated with thicker lines, and into the end position thereof indicated in thinner lines, in such a way that the bottom element 2 and the side wall element 3 form an angle of about 90°.

The initial position is defined by an endside contact of the hinge pin 10 and the hinge shell 12, which is formed by a cross-sectional contour of an end stop.

In the upright position, the side wall element 3 is supported from outside against the hinge shell 12 which in this way defines the end position.

In the end position, the bottom element 2 and the side wall element 3 are secured by bringing a detent hook 20, which is carried by a fixed projection 21 which extends substantially transverse to the side wall element 3, into engagement with a locking heel 25. The locking heel 25 is carried by a resilient finger 27 forming part of the bottom element 2. The resilient finger 27 further caries and abutment heel 26 which is supported against the side wall element 3.

The resilient finger 27 is provided immediately adjacent to the hinge shell 12 and passes substantially tangentially into the latter. The resilient finger 27 has a slightly curved cross-sectional contour with the same principal direction as the hinge shell 12 but with a greater radius. In this way, the resilient finger 27 can be elastically defected toward the hinge shell 12 and, if necessary, flatly abut the latter to prevent a rapture in case of an extremely high load. The elastical deflection property facilitates locking process because the locking heel 25 can bounce back in case of oversliding of the detent hook 20 until a position is reached in which the lock heel 25 and the detent hook 20 are interlocked. Simultaneously, the abutment heel 26 abuts the side wall element 3 so that it is supported thereagainst.

The release of the locking connection is effected in a most simple manner because the resilient finger 27 facilitates disengagement of the locking heel 25 and the detent hook 20. Therefore, this connection is particular advantageous in cases when the cable channel section must be frequently opened.

A further advantage of the present invention consists in that securing of the side wall element 3 in a partially open position becomes possible. To this end, a cam projection 13 is formed on the hinge shell 12 which cooperates with a groove 11 formed in the hinge pin 10. The cam projection 13 is held against the hinge pin 10 with some prestress so that it, during sliding along the hinge shell 12 in course of the pivotal movement, is pressed into the groove 11. The prestress and the geometry are so selected that one hand, a pivotal movement of the side wall elements is possible and, on the other hand, a sufficient retaining force for securing is guaranteed. Further, by providing a plurality of grooves 11 (not shown), the side wall element 3 can be secured in a plurality of predetermined angular positions, if desired.

The shown hinge means 10, 11, 12, 13 provides, in connection with locking means 20, 21, 25, 26, 27, a very compact structure of the cable channel section 1 which also enables an optimal handling in comparison with the existed ones up to the present solution. The assembly of the bottom element 2 with the side wall element 3 is effected by axially pushing them one into the other so that both wall elements are connected in captive manner.

Figure 5:
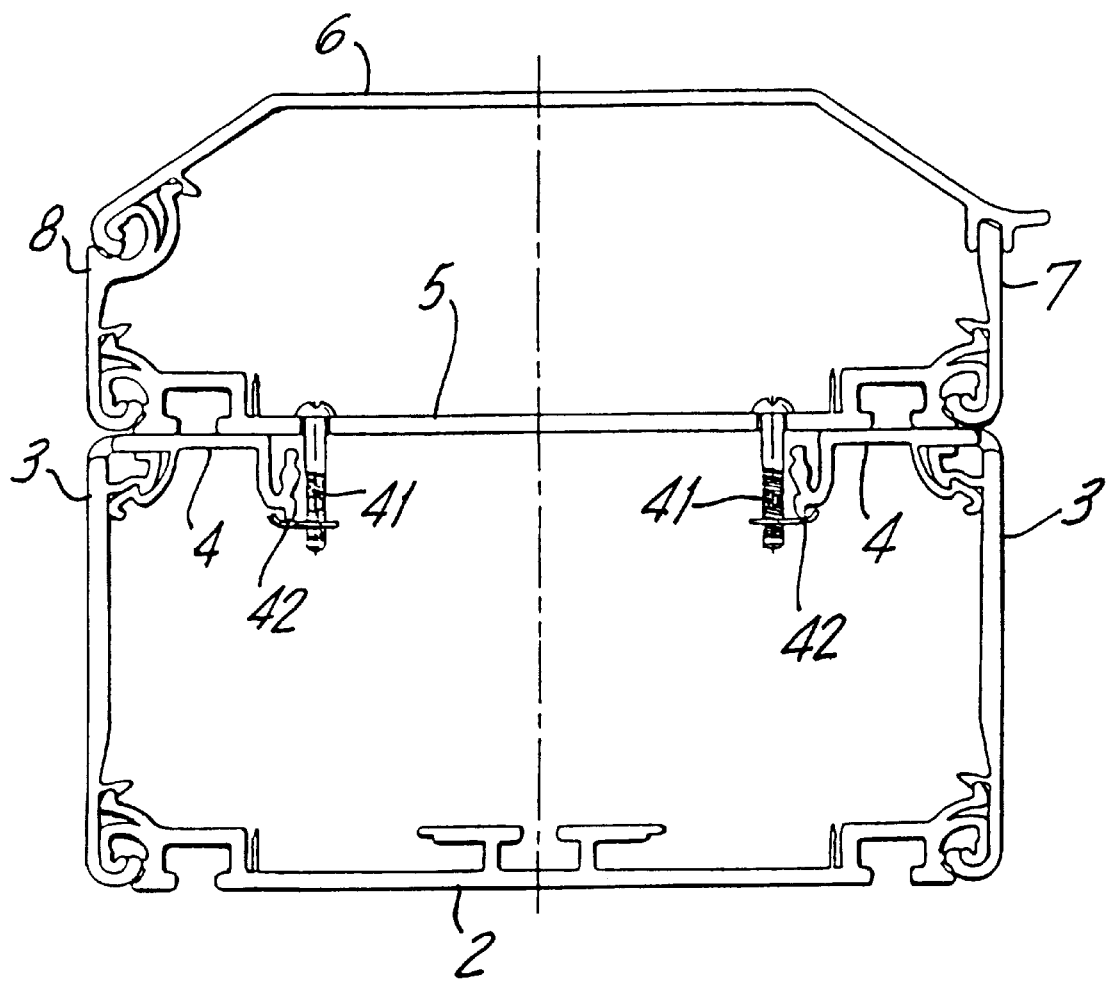
FIG. 5 a schematic view of a first embodiment of a rail channel, in which a rail channel section according to the present invention is used.
Figure 6:
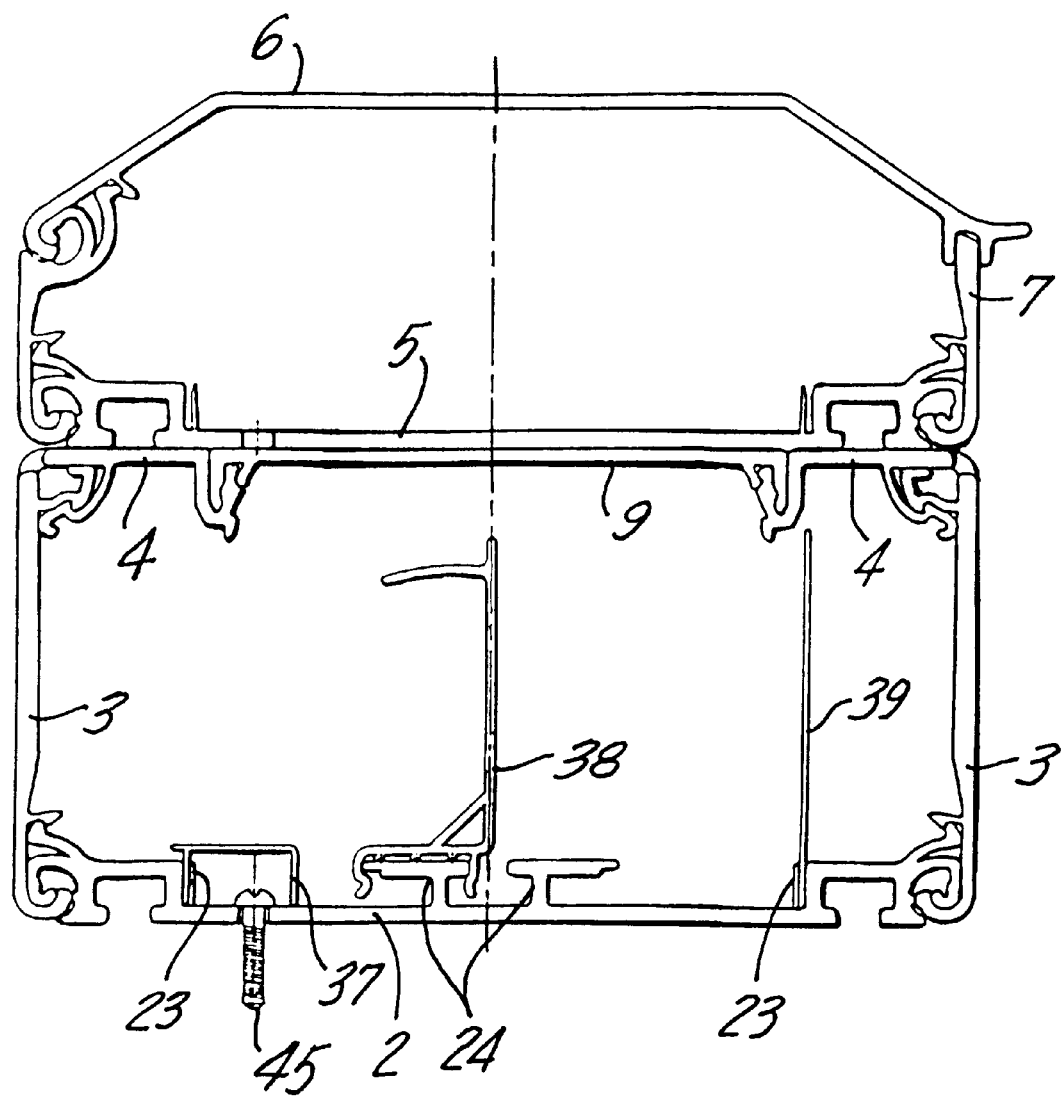
FIG. 6 a schematic view of a second embodiment of rail channel, in which a rail channel section according to the present invention is used another embodiment.
Figure 7:
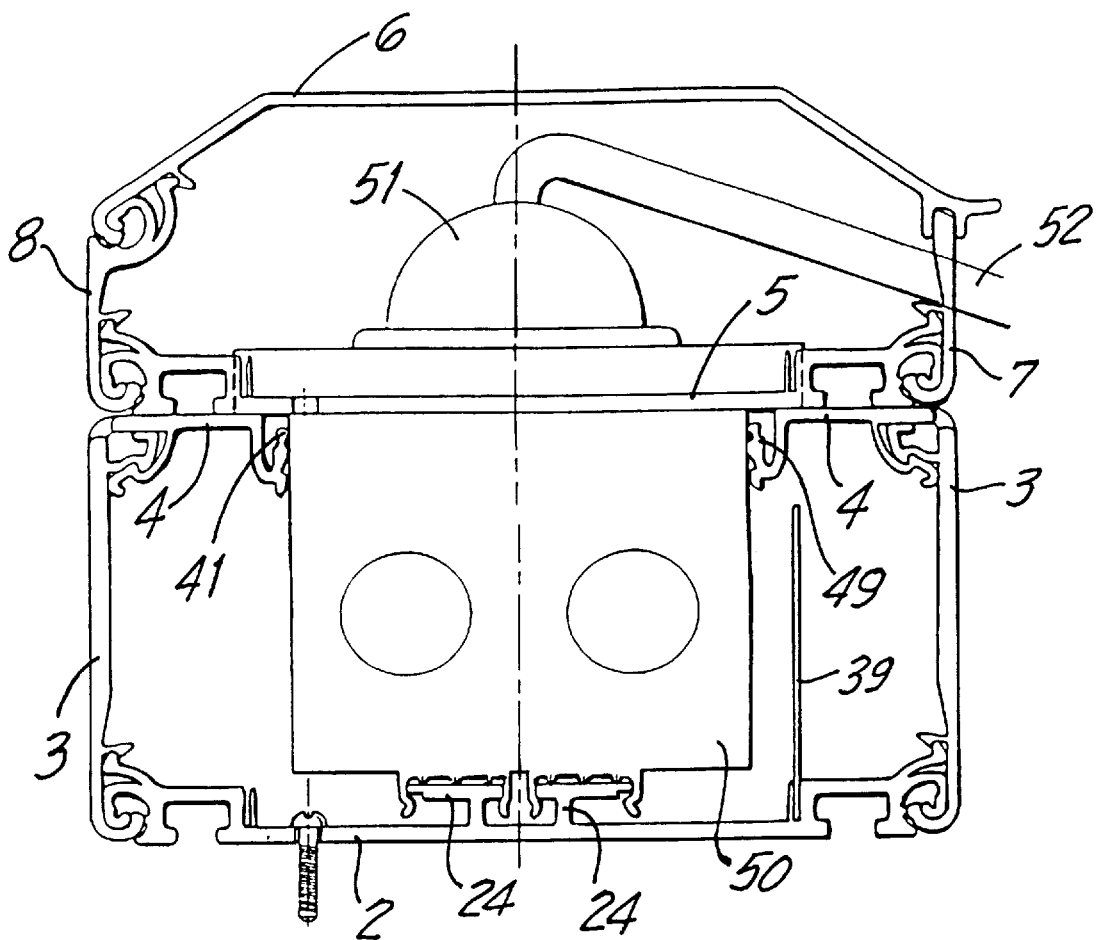
FIG. 7 a schematic view of a third embodiment of a still further embodiment in which a rail channel section according to the present invention is used.

This type of a hinge construction is not limited to the connection of the bottom element 2 with the side wall element 3 but, in the same manner, can be used for other elements, if necessary, as, e.g., for a cover elements for a rail channel, as shown in FIGS. 5–7.

In transitional regions to other wall elements, e.g., to the ledge elements 4, advantageously, hinges 30, e.g., in a form of film hinges, or co-extruded hinges from a soft material can be used. Those consists, e.g., of, as per se known, co-extruded soft-PVC and, therefore, are produced particularly economically. They do not require a modular exchange of the elements, which they connect, but rather are used where this aspect is not an essential one. In case of the inventive cable channel section, they are used in the transitional regions from the side wall elements 3 to the ledge elements 4. There significance will be explained in detail below.

Figure 4:
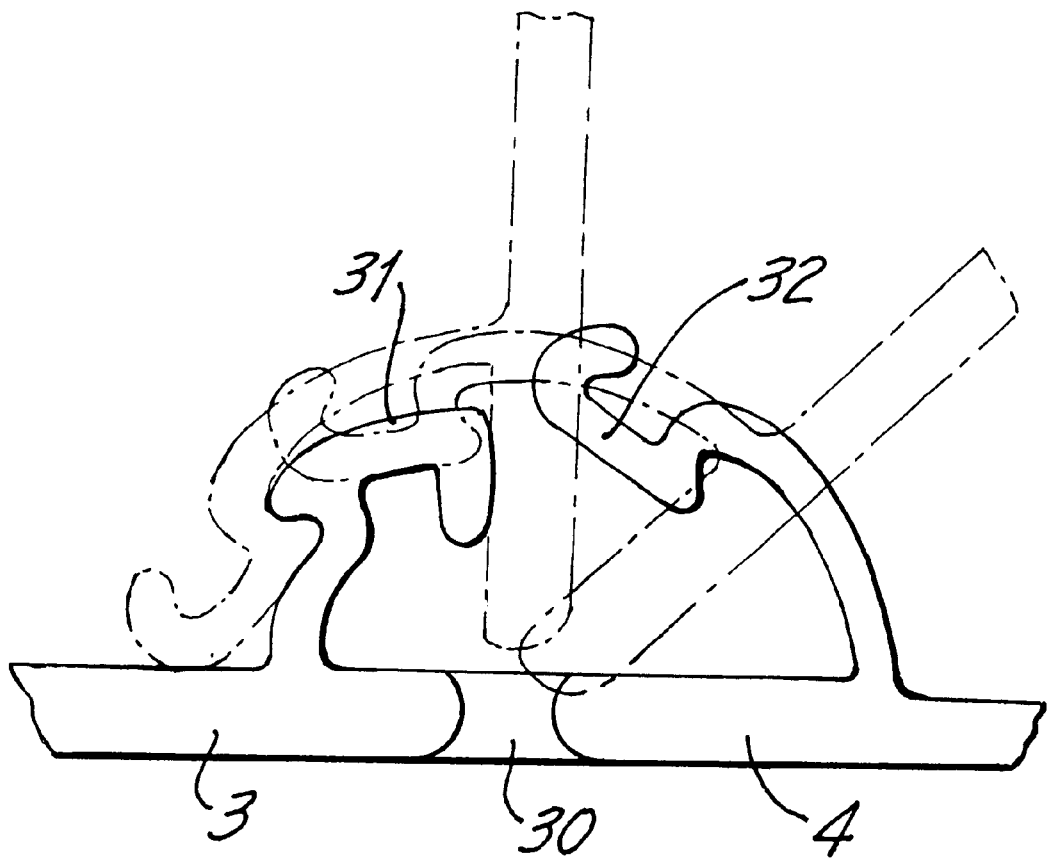
FIG. 4 a schematic view of another embodiment of a hinge connection according to the present invention.

As shown in FIG. 4, both the side wall element 3 and the ledge element 4 are formed with locking hooks 31, 32 which are aligned one against the other and, during folding of the ledge element 4, slide one against the other until they reach the end position shown in FIG. 4 and in which they are interlocked and, simultaneously, abut adjacent wall elements 3, 4. Thereby, an end position is defined which, in the example shown, corresponds to an angle of 90°.

The locking hooks 31, 32 are formed elastically deflectable so that they can be disengaged from each other, without application of a substantial force, in order to pivot the strip element 4 away. The significance of this feature is particular apparent from an embodiment of a rail channel according to FIGS. 5–7.

The rail channel shown in FIG. 5, includes, as a basic element, the cable channel 1 shown in FIGS. 1 and 2. In addition, a bridge element 5, which is supported with its front surface on the ledge elements 4, is attached with screws 41 and clamps 42. The screws 41 and the clamps 42 provide for easy adaptation to a basic element, even to one which is not formed according to the present invention.

At its opposite sides, the bridge element is connected with two spacing elements 7, 8 which cooperate with a cover element 6.

The connection of the bridge element 5 with the spacing elements 7, 8 is effected with previously described hinge elements 10–13 in the described manner. A further such hinge element connects the spacing element 8 with the cover element 6 which opens as a flap and can be retained in an open condition. The other spacing element 7 serves as a stop for the cover element 6. It should be self-evident that the bridge element 5 in an axial direction, i.e., in a direction transverse to the cutting plane in FIG. 5, is not continuous, in order to insure access to the mounting space between the two ledge elements 4.

In the embodiment shown in FIG. 6, the rail channel is provided with a wall 38 and a separation wall 39 which form channel sections which are separated from each other in such a way that, e.g., a separate laying-out of data transfer conductors and power supply conductors becomes possible. The separation wall 39 is retained on the bottom element 2 with a clamping lip 23 so that it can be simply pushed into a slot formed therein.

The shaped wall 38 is mounted on a clamp web 24 formed integrally with the bottom element 2.

Another clamp lip 23 can, e.g., be used for receiving a shaped ledge 37 which covers a screw 45 for securing the bottom element 37. The shaped ledge 37 prevents any possible metal-to-metal contact with the screw 45.

A screen g is secured between the two ledge elements 4 and covers those sections of the cable channel section which do not include connection and attachment components such, e.g., as connection boxes.

FIG. 7 shows a rail channel used for mounting a plug box 50. The plug box 50 is secured on the bottom element 2 with clamp webs 24 and extends between the two ledge elements 4. A connector plug 51, the connecting conductor 52 of which leads to a power consumer (not shown) is inserted into the plug box 50. In this embodiment, the cover element 6 is so spaced with the spacing elements 7, 8 from the ledge-elements 4 that in a closed condition, the connecting conductor 52 can be moved to a downward position in which it exists the rail channel between two spacing elements 7.

FIG. 7 shows a further advantage of the ledge elements 4, which are so formed that the inserted elements such as, e.g., the plug box 50, can be exactly inserted, being guided between guide elements 49 provided at this location. The guide elements 49 have a somewhat U-shape so that they can be engaged by the plug box 50 with some prestress. In this way, the plug box 50 can be mounted, in a flapped-out position of the ledge elements 4 on the clamp webs 24 and then, upon returning of the ledge elements 4 to the closing position, be supported against the guide elements 49. At the same time, however, an unrestricted access to the separate cable channel sections is possible because corresponding wall elements are easily releasable by disengagement of respective connections.

What is claimed is:

1. A cable channel section, comprising a plurality of wall elements pivotable in a predetermined angular region; hinge means for releasably connecting adjacent wall elements with a possibility of a pivotal movement of one of the adjacent wall elements relative to another of the adjacent wail elements, the hinge means including first and second hinge elements formed integrally with respective one and another of the adjacent wall elements and locking means for fixedly securing the adjacent wall elements in an end position thereof, the locking means including a first locking element formed as a detent hook carried by a stationary leg projecting from one of the one and the another of the adjacent wall elements, and a second locking element formed as a locking heel carried by an elastically deflectable resilient finger formed integrally with the another of the one and another of the adjacent wall elements, wherein one of the first and second hinge elements is formed as a hinge pin and another of the first and second hinge elements is formed as a hinge shell, and wherein the cable channel section further comprises stop means for securing the adjacent wall elements in an intermediate angular position, the stop means including a first stop element provided in the hinge pin, and a second stop element formed integrally with the hinge shell, and wherein one of the first and second stop elements is formed as a groove, and another of the first and second stop elements is formed as a cam projection.

2. A cable channel section according to claims 1, further comprising an abutment heel for the another of the one and another wall elements and carried by the elastically deflectable resilient finger.

3. A cable channel section according to claim 1, wherein the resilient finger is arranged immediately adjacent to a respective one of the first and second hinge elements.

4. A cable channel section according to claim 3, wherein the respective one of the first and second hinge elements has a hollow segment-shaped section, and wherein the resilient finger passes approximately tangentially into the hollow segment-shaped section of the respective one of the first and second hinge elements.

5. A cable channel section according to claim 1, wherein the resilient finger has a curved cross-sectional profile.

6. A cable channel section according to claim 1, wherein the stop means comprises a plurality of first and second stop elements for securing the adjacent wall elements in a plurality of intermediate angular positions.

7. A cable channel section according to claim 1, wherein the cable channel section is formed as a rail channel having a bottom element, two side wall elements forming, together with the bottom element, a U-shaped section, and a cover element.

8. A cable channel section according to claim 7, further comprising a ledge element provided on a side of each side wall element opposite a respective hinge element, a hinge member for pivotally connecting the ledge element with the wall side element, and means for releasaby securing the ledge element with the side wall element in a pre-determined angular position.

9. A cable channel section according to claim 8, wherein the hinge member is formed of a co-extruded soft material.

10. A cable channel section according to claim 9, wherein the hinge member is formed of soft PVC.

11. A cable channel section according to claim 9, wherein the hinge member is formed as a film hinge.

12. A cable channel section according to claim 8, further comprising bridge means releasably securable on the ledge elements for supporting the cover element.

13. A cable channel section according to claim 12, further comprising a plurality of spacing elements securable to the bridge means and supporting the cover element.

\* \* \* \* \*